United States Patent
Bach

(10) Patent No.: US 9,294,995 B2
(45) Date of Patent: Mar. 22, 2016

(54) ACTIVATE ES CELL FOR PARTICULAR UE(S)

(75) Inventor: Michael Joseph Bach, Kildeer, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 251 days.

(21) Appl. No.: 13/428,812

(22) Filed: Mar. 23, 2012

(65) Prior Publication Data

US 2013/0252660 A1 Sep. 26, 2013

(51) Int. Cl.
*H04W 36/00* (2009.01)
*H04W 52/02* (2009.01)
(Continued)

(52) U.S. Cl.
CPC ...... *H04W 52/0206* (2013.01); *H04W 36/0055* (2013.01); *H04W 52/0277* (2013.01);
(Continued)

(58) Field of Classification Search
CPC .................. H04W 36/0011; H04W 36/0083; H04W 36/005; H04W 84/045; H04W 36/0016; H04W 36/04; H04W 48/20; H04W 36/16; H04W 52/0277; H04W 72/0493; H04W 16/32; H04W 36/0044; H04W 36/0055; H04W 36/0061; H04W 48/18; H04W 52/0261; H04W 88/08; H04W 36/30; H04W 48/16; Y02B 60/50
USPC .............. 455/422.1, 436–444, 448, 522, 525; 370/328–333
See application file for complete search history.

(56) References Cited

U.S. PATENT DOCUMENTS

2007/0297386 A1* 12/2007 Zhang et al. .................. 370/344
2008/0081623 A1* 4/2008 Burgan ................. H04W 36/08
455/436

(Continued)

FOREIGN PATENT DOCUMENTS

CN 101742707 A 6/2010
EP 2416609 A1 2/2012
(Continued)

OTHER PUBLICATIONS

Mitsubishi Electric: "Dynamic Setup of HNBs for Energy Savings and Interference Reduction"; 3GPP Draft; R3-081949 (Dynamic Setup HNBs); 3rd Generation Partnership Project (3GPP), Mobile Competence Centre; 650, Route des Lucioles; F-06921 Sophia-Antipolis Cedex; France; vol. RAN WG3, no. Jeju Island; Aug. 13, 2008, XP050165010, [retrieved on Aug. 13, 2008], 1. Introduction, Scenarios 2 & 3 (chapter 2.1), E. UE and Macro-eNB (chapter 2.2).

(Continued)

Primary Examiner — Olumide T Ajibade Akonai
(74) Attorney, Agent, or Firm — Harrington & Smith

(57) ABSTRACT

A method includes determining, at a first cell and for a selected user equipment, a second cell would have a better performing RF interface connection with the selected user equipment than the selected user equipment currently has with the first cell. The first cell can provide radio frequency coverage for the second cell. The method includes sending to the second cell one or more messages indicating the second cell should not enter or be in an energy saving state at least while the selected user equipment or a selected user application on the selected user equipment is connected to the second cell. Another method includes determining a cell should not enter an energy saving state at least while a selected user equipment is connected to the cell; and the cell not entering the energy saving state at least while the selected user equipment is connected to the cell.

14 Claims, 9 Drawing Sheets

(51) Int. Cl.

| | |
|---|---|
| H04W 48/18 | (2009.01) |
| H04W 36/30 | (2009.01) |
| H04W 36/24 | (2009.01) |
| H04W 84/04 | (2009.01) |
| H04W 92/20 | (2009.01) |

(52) U.S. Cl.
CPC ........... *H04W36/0061* (2013.01); *H04W 36/24* (2013.01); *H04W 36/30* (2013.01); *H04W 48/18* (2013.01); *H04W 84/045* (2013.01); *H04W 92/20* (2013.01); *Y02B 60/50* (2013.01)

(56) References Cited

U.S. PATENT DOCUMENTS

| | | | | |
|---|---|---|---|---|
| 2008/0287080 | A1* | 11/2008 | Camp, Jr. ............... | H04B 1/406 455/127.5 |
| 2009/0252073 | A1* | 10/2009 | Kim et al. ..................... | 370/311 |
| 2011/0044284 | A1 | 2/2011 | Voltolina et al. .............. | 370/331 |
| 2012/0033611 | A1 | 2/2012 | Wu ............................... | 370/328 |
| 2012/0039226 | A1* | 2/2012 | Yang ................. | H04W 52/0277 370/311 |
| 2012/0142328 | A1* | 6/2012 | Awoniyi et al. ............... | 455/418 |
| 2012/0163305 | A1* | 6/2012 | Nimbalker et al. ........... | 370/329 |

FOREIGN PATENT DOCUMENTS

| | | |
|---|---|---|
| WO | WO 2011157290 A1 | 12/2011 |
| WO | WO 2012010074 A1 | 1/2012 |

OTHER PUBLICATIONS

Nokia Siemens Networks: "Other reasons to re-activate a dormant for ES cell"; 3GPP Draft; R3-120779_Reactivation ES; 3rd Generation Partnership Project (3GPP), Mobile Competence Centre; 650, Route des Luciones; F-06921 Sophia-Antipolis Cedex; France; vol. RAN WG3, no. San Jose del Cabo, Mexico; Mar. 26, 2012-Mar. 30, 2012, Mar. 19, 2012; XP050610786, [retrieved on Mar. 19, 2012], 2. Discussion, Figure; p. 2, paragraph 2-paragraph 5.
Deutsche Telekom: "Green RAN—UE based reactivation of deactivated RAN nodes for energy saving"; 3GPP Draft; R2-110116_Energy Saving; 3rd Generation Partnership Project (3GPP), Mobile Competence Centre; 650, Route des Luciones; F-06921 Sophia-Antipolis Cedex; France; vol. RAN WG2, no. Dublin, Ireland; Jan. 17, 2011, Jan. 10, 2011, XP050492773, [retrieved on Jan. 10, 2011]; 2.2 Reactivation of deactivated RAN nodes; 3 Conclusion; Solution 3: Cell switch on/off based on signaling across RATs (chapter 5.1.2.1) Solution 3 (chapter 5.1.2.2).
3GPP TS 23.401 V10.6.0 (Dec. 2011) "3rd Generation Partnership Project; Technical Specification Group Services and System Aspects; General Packet Radio Service (GPRS) enhancements for Evolved Universal Terrestrial Radio Access Network (E-UTRAN) access (Release 10)"; 3rd Generation Partnership Project (3GPP), Mobile Competence Centre; 650, Route des Luciones; F-06921 Sophia-Antipolis Cedex; France; pp. 1-282.
3GPP TS 32.522 V10.3.0 (Dec. 2011) "3rd Generation Partnership Project; Technical Specification Group Services and System Aspects; Telecommunication management; Self-Organizing Networks (SON) Policy Network Resource Model (NRM) Integration Reference Point (IPR); Information Service (IS) (Release 10)"; 3rd Generation Partnership Project (3GPP), Mobile Competence Centre; 650, Route des Luciones; F-06921 Sophia-Antipolis Cedex; France; pp. 1-32.
3GPP TS 36.133 V10.5.0 (Dec. 2011) "3rd Generation Partnership Project; Technical Specification Group Radio Access Network; Evolved Universal Terrestrial Radio Access (E-UTRA); Requirements for support of radio resource management (Release 10)" 3rd Generation Partnership Project (3GPP), Mobile Competence Centre; 650, Route des Luciones; F-06921 Sophia-Antipolis Cedex; France; pp. 1-544.
3GPP TS 36.423 V110.0 (Mar. 2012) "3rd Generation Partnership Project; Technical Specification Group Radio Access Network; Evolved Universal Terrestrial Radio Access Network. (E-UTRAN); X2 application protocol (X2AP) (Release 11)" 3rd Generation Partnership Project (3GPP), Mobile Competence Centre; 650, Route des Luciones; F-06921 Sophia-Antipolis Cedex; France; pp. 1-134.
3GPP TR 36.927 V10.1.0 (Sep. 2011) "3rd Generation Partnership Project; Technical Specification Group Radio Access Network; Evolved Univer4sal Terrestrial Radio Access (E-UTRA); Potential solutions for energy saving for E-UTRAN (Release 10)"; 3rd Generation Partnership Project (3GPP), Mobile Competence Centre; 650, Route des Luciones; F-06921 Sophia-Antipolis Cedex; France; pp. 1-22.
3GPP TS 36.314 V10.2.0 (Sep. 2011) "3rd Generation Partnership Project; Technical Specification Group Radio Access Network; Evolved Universal Terrestrial Radio Access (E-UTRA); Layer 2—Measurements (Release 10)"; 3rd Generation Partnership Project (3GPP), Mobile Competence Centre; 650, Route des Luciones; F-06921 Sonhia-Antipolis Cedex; France; pp. 1-17.
3GPP TS 36.413 V10.4,0 (Dec. 2011) "3rd Generation Partnership Project; Technical Specification Group Radio Access Network; Evolved Universal Terrestrial Radio Access Network (E-UTRAN); S1 Application Protocol (S1AP) (Release 10)"; 3rd Generation Partnership Project (3GPP), Mobile Competence Centre; 650, Route des Luciones; F-06921 Sophia-Antipolis Cedex; France; pp. 1-255.
3GPP TS 36.321 V10.5.0 (Mar. 2012) "3rd Generation Partnership Project; Technical Specification Group Radio Access Network; Evolved Universal Terrestrial Radio Access (E-UTRA); Medium Access Control (MAC) protocol specification (Release 10)"; 3rd Generation Partnership Project (3GPP), Mobile Competence Centre; 650, Route des Luciones; F-06921 Sophia-Antipolis Cedex; France; pp. 1-54.
3GPP TS 36.423 V9.6.0 (Mar. 2011) "3rd Generation Partnership Project; Technical Specification Group Radio Access Network; Evolved Universal Terrestrial Radio Access Network (E-UTRAN); X2 application protocol (X2AP) (Release 9)"; 3rd Generation Partnership Project (3GPP), Mobile Competence Centre; 650, Route des Luciones; F-06921 Sophia-Antipolis Cedex; France; pp. 1-121.
3GPP TS 36.213 V10.4.0 (Dec. 2011) "3rd Generation Partnership Project; Technical Specification Group Radio Access Network; Evolved Universal Terrestrial Radio Access (E-UTRA); Physical layer procedures (Release 10)"; 3rd Generation Partnership Project (3GPP), Mobile Competence Centre; 650, Route des Luciones; F-06921 Sophia-Antipolis Cedex; France; pp. 1-125.
3GPP TS 36.300 V11.0.0 (Dec. 2011) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; 3rd Generation Partnership Project (3GPP), Mobile Competence Centre; 650, Route des Luciones; F-06921 Sophia-Antipolis Cedex; France; pp. 1-194.
3GPP TS 32.762 V11.0.0 (Dec. 2011) 3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11) 56 pages.
3GPP TS 36.321 V10.5.0 (Mar. 2012) 3rd Generation Partnership Project; Technical Specification Group Radio Access Network; Evolved Universal Terrestrial Radio Access (E-UTRA); Medium Access Control (MAC) protocol specification (Release 10) 56 pages.
3GPP TS 36.133 V10.5.0 (Dec. 2011) 3rd Generation Partnership Project; Technical Specification Group Radio Access Network; Evolved Universal Terrestrial Radio Access (E-UTRA); Requirements for support of radio resource management (Release 10) 544 pages.
3GPP TS 23.203 V0.1.1 (Oct. 2005) 3rd Generation Partnership Project; Technical Specification Group Services and System Aspects; Policy and Charging Control Architecture; (Release 7) 17 pages.
3GPP TS 23.401 V11.0.0 (Dec. 2011) 3rd Generation Partnership Project; Technical Specification Group Services and System Aspects; General Packet Radio Service (GPRS) enhancements for Evolved Universal Terrestrial Radio Access Network (E-UTRAN) access.
3GPP TS 32.522 V11.1.0 (Dec. 2011) 3rd Generation Partnership Project; Technical Specification Group Services and System Aspects;

(56) References Cited

OTHER PUBLICATIONS

Telecommunication management; Self-Organizing Networks (SON) Policy Network Resource Model (NRM) Integration Reference Point (IRP); Information Service (IS).

3GPP TS 36.101 V10.5.0 (Dec. 2011) 3rd Generation Partnership Project; Technical Specification Group Radio Access Network; Evolved Universal Terrestrial Radio Access (E-UTRA); User Equipment (UE) radio transmission and reception.

3GPP TS 36.213 V10.4.0 (Dec. 2011) 3rd Generation Partnership Project; Technical Specification Group Radio Access Network; Evolved Universal Terrestrial Radio Access (E-UTRA); Physical layer procedures.

3GPP TS 36.300 V11.0.0 (Dec. 2011) 3rd Generation Partnership Project; Technical Specification Group Radio Access Network; Evolved Universal Terrestrial Radio Access (E-UTRA); Physical layer procedures.

3GPP TS 36.314 V10.2.0 (Sep. 2011) 3rd Generation Partnership Project; Technical Specification Group Radio Access Network; Evolved Universal Terrestrial Radio Access (E-UTRA); Layer 2—Measurements.

3GPP TS 36.413 V10.4.0 (Dec. 2011) 3rd Generation Partnership Project; Technical Specification Group Radio Access Network; Evolved Universal Terrestrial Radio Access Network (E-UTRAN); S1 Application Protocol (S1AP).

3GPP TR 36.927 V10.1.0 (Sep. 2011) 3rd Generation Partnership Project; Technical Specification Group Radio Access Network; Evolved Universal Terrestrial Radio Access Network (E-UTRAN); X2 application protocol (X2AP).

3GPP TS 36.423 V11.0.0 (Mar. 2012) 3rd Generation Partnership Project; Technical Specification Group Radio Access Network; Evolved Universal Terrestrial Radio Access (E-UTRA); Potential solutions for energy saving for E-UTRAN.

\* cited by examiner

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER $(0..2^{32}-1)$ | MME UE S1AP ID allocated at the MME | -- | -- |
| >UE Security Capabilities | M | | 9.2.29 | | -- | -- |
| >AS Security Information | M | | 9.2.30 | | -- | -- |
| >UE Aggregate Maximum Bit Rate | M | | 9.2.12 | | -- | -- |
| >Subscriber Profile ID for RAT/Frequency priority | O | | 9.2.25 | | -- | -- |
| >E-RABs To Be Setup List | | 1 | | | -- | -- |
| >>E-RABs To Be Setup Item | | 1 .. <maxnoof Bearers> | | | EACH | ignore |
| >>>E-RAB ID | M | | 9.2.23 | | -- | -- |
| >>>E-RAB Level QoS Parameters | M | | 9.2.9 | Includes necessary QoS parameters | -- | -- |
| >>>DL Forwarding | O | | 9.2.5 | | -- | -- |
| >>>UL GTP Tunnel Endpoint | M | | GTP Tunnel Endpoint 9.2.1 | SGW endpoint of the S1 transport bearer. For delivery of UL PDUs. | -- | -- |
| >RRC Context | M | | OCTET STRING | Includes the RRC Handover Preparation Information message as defined in subclause 10.2.2 of TS 36.331 [9]. | -- | -- |
| >Handover Restriction List | O | | 9.2.3 | | -- | -- |
| >Location Reporting Information | O | | 9.2.21 | Includes the necessary parameters for location reporting | -- | -- |
| >Management Based MDT Allowed | O | | 9.2.59 | | YES | ignore |
| UE History Information | M | | 9.2.38 | Same definition as in TS 36.413 [4]. | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Don't go Dormant | O | | 9.2.x.x. | | | |

FIG. 5

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Activate | | 1 .. <maxCellineNB> | | | GLOBAL | reject |
| >ECGI | M | | 9.2.14 | | - | - |
| >Enable for UE | O | | 9.2.x.y | | - | - |

FIG. 6

| IE/Group Name | Presence | Range | IE type and reference | Semantics description | Criticality | Assigned Criticality |
|---|---|---|---|---|---|---|
| UE List Item | | 1 .. <maxnoofUEs> | | | | |
| eNB UE X2AP ID | M | | 9.2.24 | | - | - |

| Range bound | Explanation |
|---|---|
| maxnoofUEs | Maximum no. of UEs. Value is 256. |

FIG. 7

| IE/Group Name | Presence | Range | IE type and reference | Semantics description |
|---|---|---|---|---|
| E-RAB Level QoS Parameters | | | | |
| >QCI | M | | INTEGER (0..255) | QoS Class Identifier defined in TS 23.401 [11]. Coding specified in TS 23.203 [13]. |
| >Allocation and Retention Priority | M | | 9.2.1.60 | |
| >GBR QoS Information | O | | 9.2.1.18 | This IE applies to GBR bearers only and shall be ignored otherwise. |

FIG. 8

ACTIVATE ES CELL FOR PARTICULAR UE(S)

TECHNICAL FIELD

This invention relates generally to wireless communications and, more specifically, relates to base stations and interaction of the base stations with user equipment.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP third generation partnership project
AOA angle of arrival
AP access point
CQI channel quality indicator
DCA discontinuous carrier activation
DL downlink (from base station to UE)
EMS element management system
eNB or eNodeB evolved Node B (e.g., LTE base station)
E-RAB E-UTRAN radio access bearer
ES energy savings
E-UTRAN evolved UTRAN
GBR guaranteed bit rate
hetnet heterogeneous network
HO handover
ID identification
IE information element
LTE long term evolution
MCS modulation and coding scheme
MDT minimization of drive test
MIMO multiple input-multiple output
MME mobility management entity
NSN Nokia Siemens Networks
O&M operations and maintenance
PH power headroom
PRB physical resource block
QCI QoS class identifier
RACH random access channel
RAN radio access network
RAT radio access technology
Rel release
RF radio frequency
RI rank indicator
RLF radio link failure
RNL radio network layer
RSRP reference signal received power
RSRQ reference signal received quality
RRM radio resource management
RRC radio resource control
Rx reception or receiver
SINR signal to interference plus noise ratio
SRS sounding reference signal
TA time alignment
TS technical standard
TR technical report
Tx transmission or transmitter
UE user equipment
UL uplink (from UE to base station)
UTRAN universal terrestrial radio access network
QoS quality of service An Energy Savings (ES) method via deactivating unneeded eNB cell(s) has been a supported functionality in LTE since Rel-9. 3GPP TS 36.423 V9.6.0 (2011-03), section 8.3.11 (Cell Activation) provides stage 3 details for the X2 application protocol (X2AP) including the Cell Activation procedure used to request to a neighboring eNB to switch on one or more cells, previously reported as inactive due to energy saving reasons. 3GPP TS 36.300 V11.0.0 (2011-12), provides the Overall E-UTRA and E-UTRAN description where section 22.4.4.2 ("Solution description"), currently contains the following text regarding support for Energy Savings:

"All informed eNBs maintain the cell configuration data also when a certain cell is dormant. ENBs owning non-capacity boosting cells may request a re-activation over the X2 interface if capacity needs in such cells demand to do so. This is achieved via the Cell Activation procedure."

Cell re-activation occurs when "capacity needs demand to do so". But there may be other needs besides capacity needs at the non-capacity boosting (e.g., coverage) cell that may demand reactivation of a cell.

SUMMARY

This Summary is meant to be exemplary and illustrates possible examples of implementations.

An exemplary embodiment is a method including determining, at a first cell and for a selected user equipment, a second cell would have a better performing radio frequency interface connection with the selected user equipment than the selected user equipment currently has with the first cell. The first cell can provide radio frequency coverage for the second cell. The method includes sending to the second cell one or more messages comprising one or more instructions the second cell should not enter or be in an energy saving state at least while the selected user equipment or a selected user application on the selected user equipment is connected to the second cell. The sending is responsive to a determination the second cell would have a better performing radio frequency interface connection with the selected user equipment than the selected user equipment currently has with the first cell.

In an additional exemplary embodiment, a computer program product is disclosed that includes a computer-readable storage medium bearing computer program code embodied therein for use with a computer. The computer program code includes: code for determining, at a first cell and for a selected user equipment, a second cell would have a better performing radio frequency interface connection with the selected user equipment than the selected user equipment currently has with the first cell, wherein the first cell can provide radio frequency coverage for the second cell; and code for sending to the second cell one or more messages comprising one or more instructions the second cell should not enter or be in an energy saving state at least while the selected user equipment or a selected user application on the selected user equipment is connected to the second cell, the sending responsive to a determination the second cell would have a better performing radio frequency interface connection with the selected user equipment than the selected user equipment currently has with the first cell.

In another exemplary embodiment, an apparatus includes one or more processors and one or more memories including computer program code. The one or more memories and the computer program code are configured, with the one or more processors, to cause the apparatus to perform at least the following: determining, at a first cell and for a selected user equipment, a second cell would have a better performing radio frequency interface connection with the selected user equipment than the selected user equipment currently has with the first cell, wherein the first cell can provide radio frequency coverage for the second cell; and sending to the second cell one or more messages comprising one or more instructions the second cell should not enter or be in an energy saving state at least while the selected user equipment or a selected user application on the selected user equipment is connected to the second cell, the sending responsive to a determination the second cell would have a better performing radio frequency interface connection with the selected user equipment than the selected user equipment currently has with the first cell.

In a further exemplary embodiment, an apparatus is disclosed that includes means for determining, at a first cell and for a selected user equipment, a second cell would have a better performing radio frequency interface connection with the selected user equipment than the selected user equipment currently has with the first cell, wherein the first cell can provide radio frequency coverage for the second cell; and means for sending to the second cell one or more messages comprising one or more instructions the second cell should not enter or be in an energy saving state at least while the selected user equipment or a selected user application on the selected user equipment is connected to the second cell, the sending responsive to a determination the second cell would have a better performing radio frequency interface connection with the selected user equipment than the selected user equipment currently has with the first cell.

In another exemplary embodiment, a method is disclosed that includes determining a cell should not enter an energy saving state at least while a selected user equipment is connected to the cell; and the cell not entering the energy saving state at least while the selected user equipment is connected to the cell.

In an additional exemplary embodiment, a computer program product is disclosed that includes a computer-readable storage medium bearing computer program code embodied therein for use with a computer. The computer program code includes: code for determining a cell should not enter an energy saving state at least while a selected user equipment is connected to the cell; and code for the cell not entering the energy saving state at least while the selected user equipment is connected to the cell.

In another exemplary embodiment, an apparatus includes one or more processors and one or more memories including computer program code. The one or more memories and the computer program code are configured, with the one or more processors, to cause the apparatus to perform at least the following: determining a cell should not enter an energy saving state at least while a selected user equipment is connected to the cell; and the cell not entering the energy saving state at least while the selected user equipment is connected to the cell.

In a further exemplary embodiment, an apparatus is disclosed that includes means for determining a cell should not enter an energy saving state at least while a selected user equipment is connected to the cell; and code for causing the cell not to enter the energy saving state at least while the selected user equipment is connected to the cell.

BRIEF DESCRIPTION OF THE DRAWINGS

In the attached Drawing Figures:

FIG. 5 illustrates a table representing a number of IEs and including a "Don't go Dormant" IE useful for exemplary embodiments of the instant invention;

FIG. 6 illustrates a table of possible elements in a Cell Activation Request message in accordance with an exemplary embodiment;

FIG. 7 illustrates two tables for an Enable for UE IE, a first table describing elements of the IE and a second table describing a maxnoofUEs range;

FIG. 8 is a table of E-RAB Level QoS Parameters from section 9.2.1.15 of 3GPP TS 36.413 V10.4.0 (2011-12);

DETAILED DESCRIPTION OF THE DRAWINGS

As stated above, there may be other needs besides capacity needs at the non-capacity boosting (e.g., coverage) cell that may demand reactivation of a cell. 3GPP TR 36.927 V10.1.0 (2011-09) states the following (see section 4):

"Energy saving solutions identified in this study item should be justified by valid scenario(s), and based on cell/network load situation. Impacts on legacy and new terminals when introducing an energy saving solution should be carefully considered. The scope of the study item shall be as follows:

User accessibility should be guaranteed when a cell transfers to energy saving mode Backward compatibility and the ability to provide energy saving for Rel-10 network deployment that serves a number of legacy UEs Solutions shall not impact the Uu physical layer The solutions should not impact negatively the UE power consumption"

Figure 1:
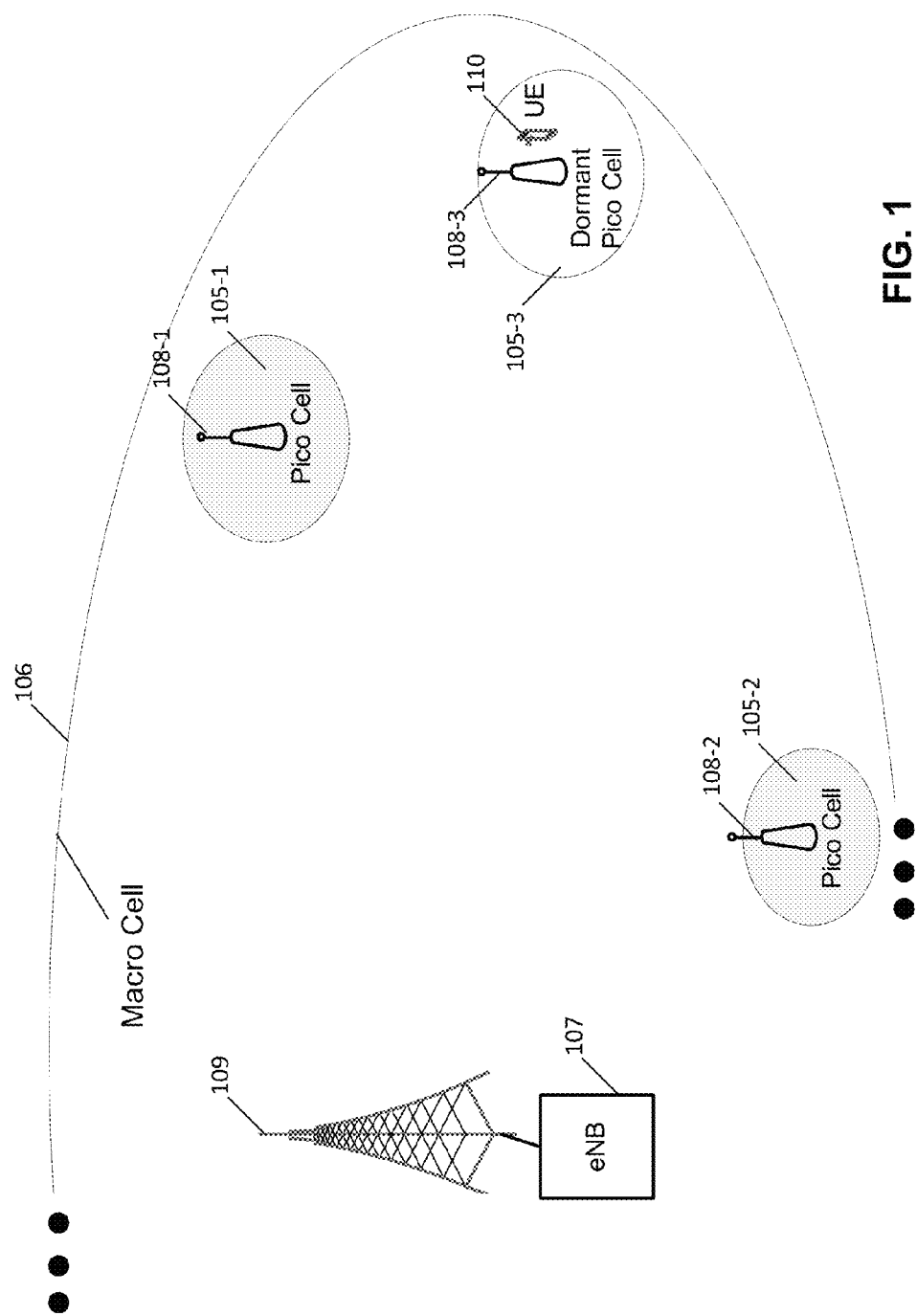
FIG. 1 illustrates a hetnet scenario.

Taking the last quoted statement from TR 36.927 that "The solutions should not impact negatively the UE power consumption", consider a hetnet scenario such as that shown in FIG. 1. In this example, the eNB 107 at the tower 109 creates the macro cell 106. There are two active pico cells 105-1, 105-2, and one dormant pico cell 105-3, each of which is formed by a corresponding eNB (e.g., an access point (AP)) 108. Each of the cells 105 and 106 has a corresponding coverage area illustrated in the figure. The UE 110 is within the pico cell 105-3, but the cell 105-3 is dormant. It is helpful at this point to provide a short description of terminology. Depending on the 3GPP standard being examined, the pico cell may be referred to as an "original" cell or a "capacity booster" cell and the macro cell may be referred to as a "candidate" cell or a "coverage" (or "covering") cell.

A typical hetnet environment has pico cells 105 deployed for both capacity (e.g., hot spot) and coverage (e.g., dead spot) reasons. In some places, e.g., a cell edge or in a building, a pico cell may be added for both reasons. Pico cells 105 can also be beneficial for improving bearer data rates. A prime advantage of deploying pico cells is the deployment enables low Tx power for nearby UEs 110, which reduces UE power usage and interference.

Given an ES enabled pico cell 105 and a UE 110 within the normal coverage area of the pico cell 105 when activated as shown in the diagram, if the ES enabled pico cell 105 goes dormant (as shown by cell 105-3), then the UE 110 must connect to the macro node antenna (e.g., 109) that can be a kilometer or more away, as opposed to the ES pico cell 105-3 which is only, e.g., 50 meters away (e.g., to the antenna of the capacity boosting cell 105-3). The UE power consumption and transmit power will then be higher to compensate for the additional propagation losses to achieve the necessary SINR. While the increased power amount may not significantly impact UE battery life using some user applications, if the UE 110 requires a high volume and rate of uplink traffic while running other types of user applications (e.g., video), then a significant negative impact on UE power consumption is to be expected with the nearby node 105-3 deactivated. Therefore, the pico eNB 108-3 may need to be re-activated to meet UE battery savings needs, as well as for macro capacity needs since the ES solution should not impact negatively UE power consumption. Degradation of UE QoS may also arise due to the differences in the uplink signal path between transmitting to the nearby pico cell 105 or a distant macro cell 106. Furthermore, inter-RAT scenarios may require a legacy RAT node to reactivate a dormant LTE node when a user requires high speed data or LTE only capable services.

Thus, there is a need for activating via eNB interfaces a dormant cell besides for capacity needs, namely for some UE power/data reasons or other needs in accordance with the scope given in TR 36.927.

Furthermore, there is a need for a cell not to go dormant for ES reasons even if the average cell load is low enough such that the load would trigger the cell to do so per conventional systems due to some UE power/data reasons.

These needs are met by exemplary embodiments of the instant invention. In one aspect of the invention, methods, apparatus, and program products are presented for activating dormant ES cells for particular UE(s).

Figure 2:
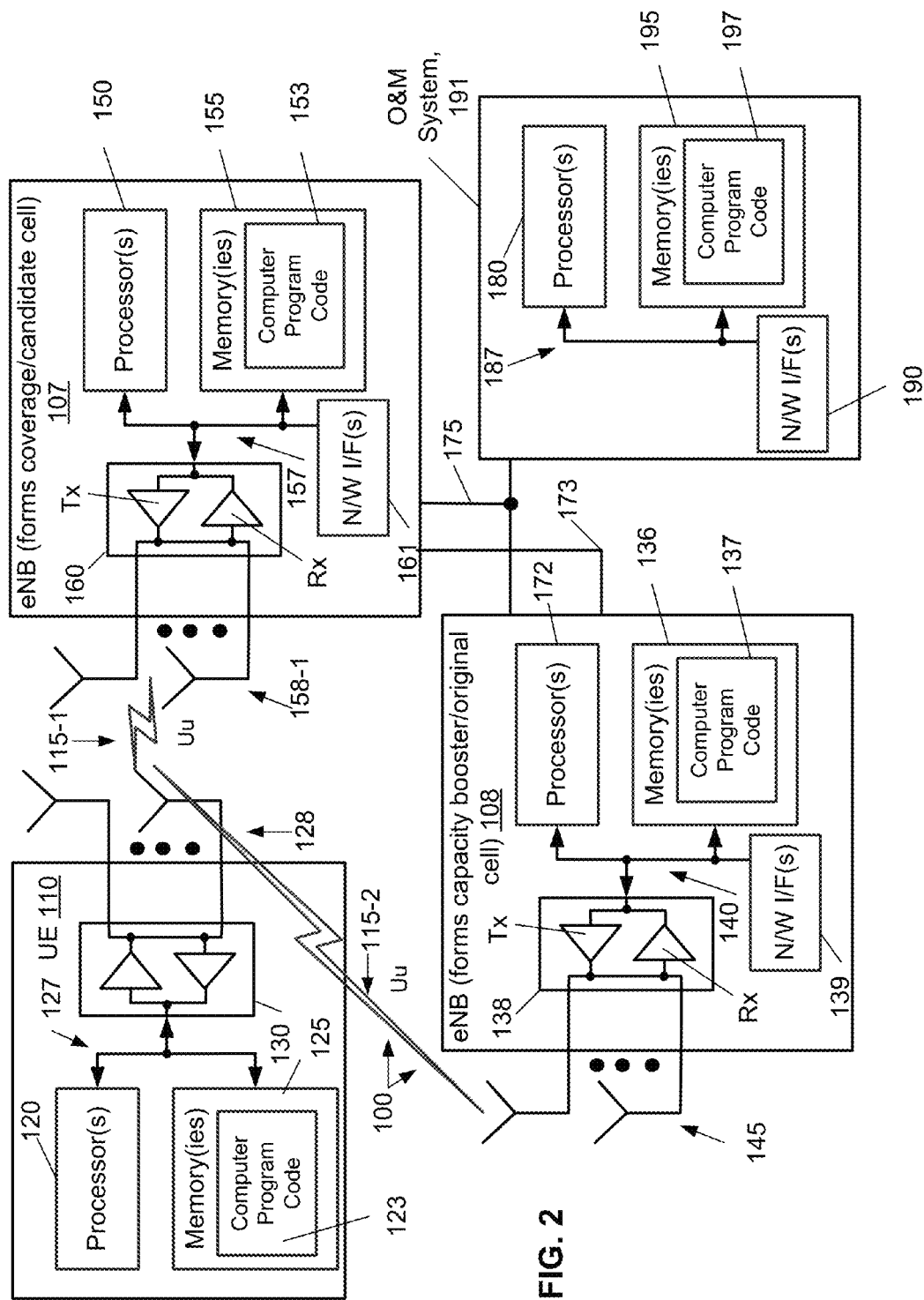
FIG. 2 illustrates an exemplary system in which the exemplary embodiments of the instant invention may be practiced.

Before proceeding with additional description regarding activating dormant ES cells for particular UE(s), reference is made to FIG. 2, which illustrates an exemplary system in which the exemplary embodiments of the instant invention may be practiced. In FIG. 2, a user equipment (UE) 110 is in wireless communication with a network 100 via one of the wireless links 115-1 (with eNB 107) or the wireless link 115-2 (with pico eNB 108), where the wireless links 115 can implement a Uu interface. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The network 100 includes eNB 107, eNB 108, and O&M system 191. In the examples presented herein, the eNB 107 forms the coverage/candidate cell 106 (see FIG. 1) and the eNB 108 forms the capacity booster/original cell 105 (see FIG. 1). The eNodeB 107 includes one or more processors 150, one or more memories 155, one or more network interfaces (N/W I/F(s)) 161, and one or more transceivers 160 (each comprising a transmitter, Tx, and a receiver, Rx) interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNodeB 107 to perform one or more of the operations as described herein. The one or more network interfaces 161 communicate over networks such as the networks 173, 175.

The eNB 108 includes one or more processors 172, one or more memories 136, one or more network interfaces (N/W I/F(s)) 139, and one or more transceivers 138 (each comprising a transmitter, Tx, and a receiver, Rx) interconnected through one or more buses 140. The one or more transceivers 160 are connected to one or more antennas 145. The one or more memories 136 include computer program code 137. The one or more memories 136 and the computer program code 137 are configured to, with the one or more processors 172, cause the eNB 108 to perform one or more of the operations as described herein. The one or more network interfaces 139 communicate over networks such as the networks 173, 175.

The O&M system 191 includes one or more processors 180, one or more memories 195, and one or more network interfaces (N/W I/F(s)) 190 interconnected through one or more buses 187. The one or more memories 195 include computer program code 197. The one or more memories 195 and the computer program code 197 are configured to, with the one or more processors 180, cause the O&M system 191 to perform one or more of the operations as described herein. The one or more network interfaces 190 communicate over networks such as the networks 173, 175.

The eNodeB 107 and the eNB 108 communicate using, e.g., network 173. The network 173 may be wired or wireless or both and may implement, e.g., an X2 interface (see, e.g., 3GPP TS 36.423 V11.0.0 (2012-03)). The O&M system uses the network 175 to communicate with the eNodeB 107 and eNB 108. The network 175 may be wired or wireless or both and may implement, e.g., an Itf-S interface.

The computer readable memories 136, 155, and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 150, 172, and 180 may be of any type suitable to the local technical environment, and may include one or more of general purpose computers, special purpose computers, microprocessors, digital signal processors (DSPs) and processors based on a multi-core processor architecture, as non-limiting examples.

Figure 3:
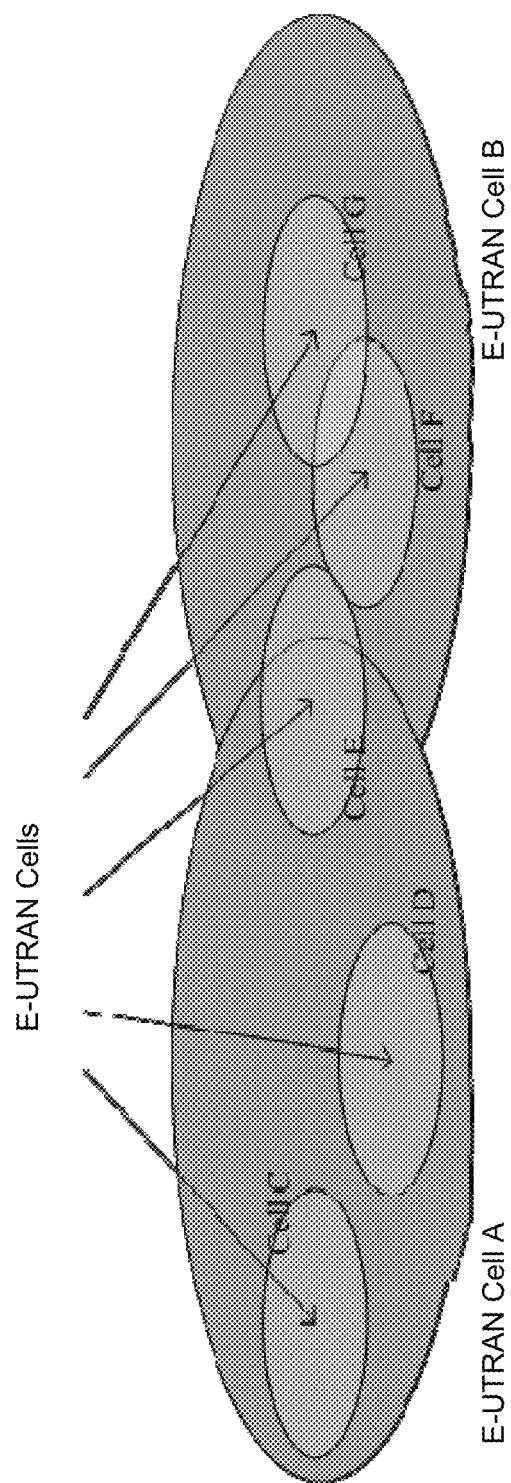
FIG. 3 is an example of a possible hetnet scenario.

As stated above, exemplary embodiments of the instant invention concern activating dormant ES cells for particular UE(s). Referring to FIG. 3, an example of a possible hetnet scenario is shown. Cells A and B are coverage cells, and cells C, D, E, F, and G are capacity booster cells. In this example, cell A provides coverage for cells C, D, and E, and cell B provides coverage for cells E, F, and G. 3GPP RAN3 has had the following Energy Saving application scenario since Rel-9:

Where capacity booster cell(s) (e.g., a cell such as cell C) can turn off given their traffic load is under a switch-off threshold and coverage cell (cell A) is under a configured switch-off threshold for time duration in order to optimize energy consumption. Neighbors are notified via the Deactivation Indication IE in the X2AP: ENB Configuration Update message.

As macro coverage cell A exceeds a configured traffic switch-on threshold for a given duration, cell A may send an X2:Cell Activation Request message to dormant cell(s) to switch-on. TR 36.927 indicates that an ES should not impact negatively UE power consumption. An NSN study has concluded that a majority of reported customer care issues are related to coverage or quality.

3GPP TS 32.762 V11.0.0 (2011-12) contains the following terminology for the ES cells: "candidate cell is a cell which can provide coverage when the original cell goes into Energy Saving state." The following is a general high level ES process flow using configured attribute terminology from SA5 (a telecom management group within 3GPP):

1) Original (e.g., capacity booster) cell esSwitch attribute configured value is On;
2) Original cell is ESCoveredBy attribute value configured with Yes for at least one candidate (e.g., coverage) cell;
3) Original cell load falls below thresholds (e.g. esActivationOriginalCellLoadParameters, esActivationCandidateCellLoadParameters) for a configured time duration;
4) Original cell offloads any remaining UEs via HO with RNL cause set to Switch Off Ongoing;
5) Original cell sends eNB Configuration Update message to neighbors (Deactivation Indication IE included) and deactivates;
6) Candidate cell esDeactivationCandidateCellsLoadParameters load surpasses threshold for time duration;
7) Candidate cell sends Cell Activation Request message to inactive Original cell;
8) Original cell switches on cell and returns the Cell Activation Response message; and
9) Original cell informs neighbor cell(s) about the re-activation via the eNB Configuration Update message (Deactivation Indication IE, described below, not included).

Problems with current ES usage and corresponding quality include the following. Currently the trigger for ES specified per TS 32.522 is not tied to particular user(s), but rather is threshold-based on total PRB load. UE(s) using apps such as high rate UL video may consume significant UE battery life with a local pico cell (e.g., capacity booster cell 105) off, while the pico cell load for one UE falls under the traffic switch-off threshold (e.g. esActivationOriginalCellLoadParameters), which is based on an aggregate PRB percentage. So such a UE's battery life is degraded in certain instances if ES is enabled. QoS may also be degraded.

Exemplary embodiments of the instant invention correct these problems. In an exemplary embodiment, a method of enabling better targeting of energy saving techniques in a cellular network is disclosed. A first (e.g., coverage) cell monitors allocated UEs for any requiring high performance and/or having significant UE battery usage (e.g., based on power headroom reporting as given in TS 36.321 section 5.4.6). The first cell detects a UE requiring high performance and/or having significant UE battery usage. The first cell also detects whether such UE(s) are in or are arriving into a dormant second (e.g., capacity booster) cell coverage area, wherein the dormant cell would provide better performance and/or UE battery life to the UE than would the current first cell. In this exemplary situation, the first cell sends, e.g., one or both of activation and handover messages that indicate the second cell should be activated and remain activated during at least the use of the user application(s) of the UE(s) requiring better performance and/or UE battery life.

In further exemplary embodiments, as part of a method of activating a dormant cell to serve a UE requiring high RF performance, possible triggers to be used by the first cell for detecting UEs requiring high RF performance include the following: particular QCI value(s) in the S1AP bearer setup procedures (see TS 36.413) for a UE, e.g., QCI values for user applications requiring high bit rate, low latency such as real time gaming (QCI=3) and/or live streaming video (QCI=2) and/or large values for GBR QoS information as specified in TS 23.401.

After the first cell has detected UE(s) requiring and/or using high performance software and/or having high battery usage that are in or may arrive in a second cell coverage area, the first cell includes UE information in a message (e.g. the X2: HANDOVER REQUEST message) that indicates to the second cell receiving the UE information in the message that the second cell should not hand the UE back to the first eNB (forming the first cell) and deactivate due to low overall load.

Exemplary methods for configuring eNB policy for going dormant include the following non-limiting examples. An eNB can be configured to include one or more of the following exemplary, non-limiting attributes, which can then be used in determining whether to turn on a dormant cell: 1) Cell load threshold(s) based on individual UE uplink GBR E-RAB usage (e.g., add to 3GPP TS 32.522); 2) An attribute based on PRB usage; 3) duration time (e.g., for the previously dormant cell to be active).

Determination of UE transmission cost in coverage (e.g., candidate) cell may be based on a UE performance metric composed of one or more of the following parameters and their corresponding limits: 1) power headroom (PH): low average; spatial multiplexing: No; bit rate: high; and/or MCS: low average. Additional information concerning these metrics are described below.

There are a number of techniques useful to detect if a UE is entering or resides in the coverage area of a capacity booster cell 105: 1) internal mechanisms of the coverage eNB, e.g. TA/AOA mechanisms; 2) probing, where the coverage cell activates pico cell(s) for a brief time period to obtain UE measurements; 3) a pico cell is in a discontinuous carrier activation mode; 4) UE reports based, e.g., on satellite location systems; 5) Minimization of drive testing (MDT); 6) UE measurement reports of other cells on the same and/or different carriers; 7) requests to a positioning server; and 8) combinations of the above.

Figure 4:
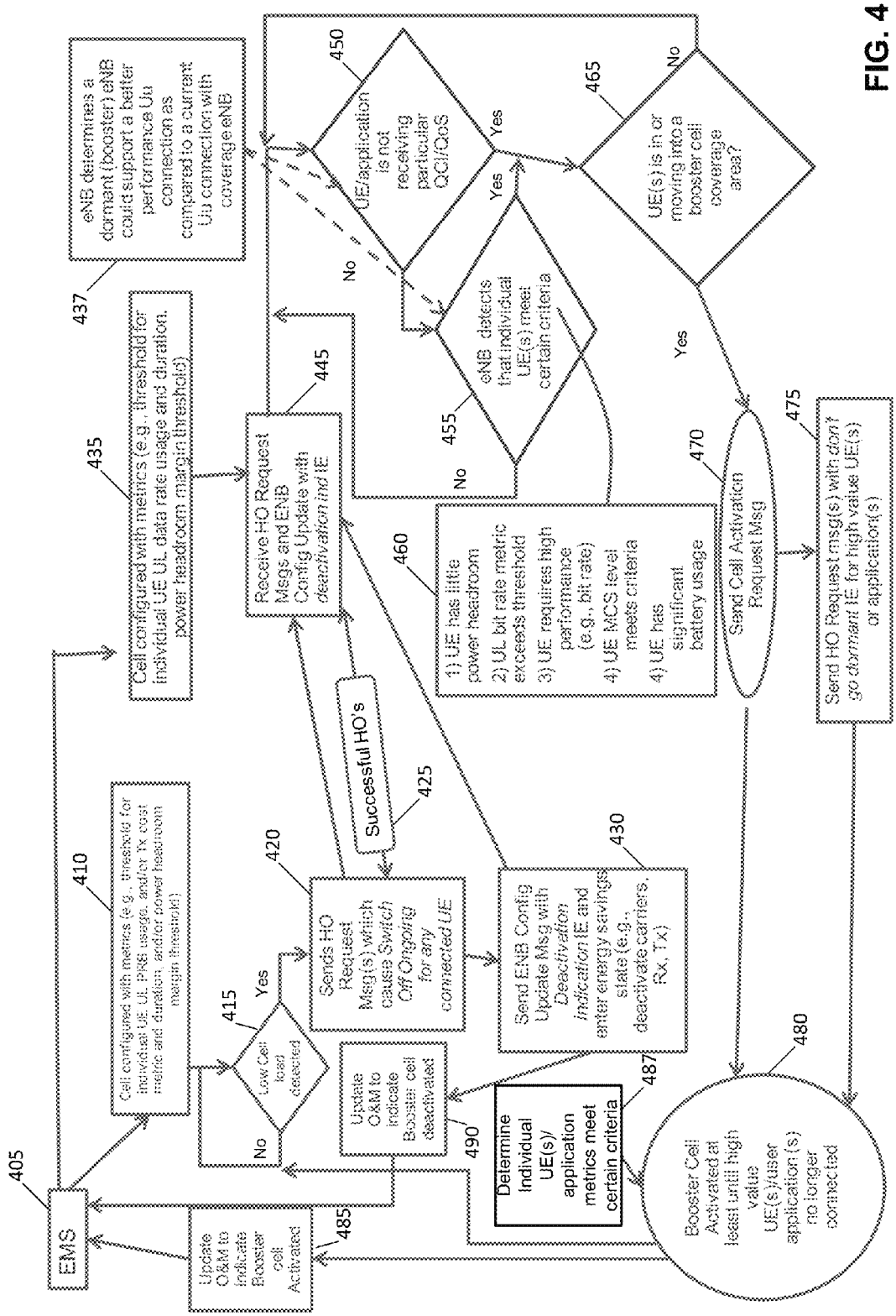
FIG. 4 is a block diagram illustrating exemplary interactions taken by a number of entities in a network in order to activate an ES cell for particular UE(s)

Turning now to FIG. 4, this figure is a block diagram illustrating exemplary interactions taken by a number of entities in a network in order to activate an ES cell for particular UE(s). The element management system (EMS) is typically a function performed by O&M system 191, although this function may be performed by other entities in the network 100. The EMS 405 operates to perform part of blocks 410 and 435. An eNB 108 that forms the capacity booster cell 105 performs blocks 410, 415, 420, 425, 430, 480, 485, and 490. An eNB 107 that forms the coverage cell 106 performs blocks 425, 435, 445, 450, 455, 460, 465, 470, and 475. For simplicity, cells 105 and 106 are mainly referred herein in reference to FIG. 4, but it is to be understood that the corresponding eNBs 108, 107 (respectively) cause the operations in the blocks to be performed.

The EMS 405 configures the capacity booster cell 105 in block 410 with certain metrics (e.g., a threshold for individual UE UL PRB usage, and/or Tx cost metric and duration, and/or power headroom margin threshold). In this example, the capacity booster cell uses similar mechanisms as used by the coverage cell to determine if the capacity booster cell needs to be activated for UE reasons. These may be configurable. These are in addition to conventional configurations of average PRB usage. So, the capacity booster cell does not deactivate simply based on average PRB load thresholds as described above, but also based on individual UE criteria which are described herein that the coverage cell also uses, e.g., if the booster cell is already deactivated. In block 435, the EMS 405 acts to configure the coverage cell 106 with certain exemplary metrics (e.g., a threshold for individual UE UL data rate usage and duration, and/or power headroom margin threshold). Other possible metrics are indicated in blocks 450 and 460, and block 435 may also configure thresholds for these other metrics.

Blocks 415, 420, 425, and 430 illustrate a typical sequence for a capacity booster cell 105 to place itself into an energy saving state, e.g., wherein Tx and Rx in the transceiver 138 are off or at least transmission and reception is not occurring using the Tx and Rx. In block 415, the capacity booster cell 105 determines if low cell load is detected. In an example, a determination is made there is low cell load in response to the cell load falling below one or more thresholds for a configured time duration as well as no individual UE needs require continued activation of the nearby capacity booster cell. Exemplary thresholds are described below. Such a load threshold could be configured, e.g., in block 410. If a low cell load is not detected in block 415 (block 415=No), the capacity booster cell 105 continues in block 415 (i.e., the capacity booster cell 105 continues to service connected UEs). If a low cell load is detected in block 415 (block 415=Yes) and no individual UE needs require continued activation of the nearby capacity booster cell, the capacity booster cell 105 continues in block 420, where the capacity booster cell 105 sends Handover (HO) Request messages (Msg(s)) to the coverage cell 106 with a handover cause of Switch Off Ongoing per 3GPP TS 36.423 for any connected UE. This causes UEs connected to the capacity booster cell 105 to be handed over and connected to the coverage cell 106. In typical scenarios, a UE should connect to a strongest cell if idle or be handed over to a cell based on existing radio resource measurements (which are already defined in 3GPP TS 36.133) taken by the UE. If the UE is within some distance from the capacity booster cell 105, generally the booster cell's Tx signal is seen by UE as the strongest signal (relative to the Tx signal of the coverage cell 106) based on, e.g., RSRP and RSRQ level measurements. Where this is the case (Tx of capacity booster cell 105 greater than Tx of coverage cell 106) typically defines the coverage area for the capacity booster cell 105 and may also be used to define the coverage area of the coverage cell 106.

The capacity booster cell 105 cooperates with the coverage cell 106 to perform handovers of UEs connected to the capacity booster cell 105 to the coverage cell 106 in block 425. In block 430, the capacity booster cell 105 sends neighbor cell(s) an eNB Configuration (Config) Update Message (Msg) with a Deactivation Indication IE and the capacity booster cell 105 enters an energy savings state (e.g., carriers are deactivated, such as by turning off the Rx, Tx of transceiver 138) and becomes dormant. In block 490, the capacity booster cell 105 updates the O&M system 191 (e.g., via the EMS 405) to indicate the booster cell is deactivated. The capacity booster cell 105 is now dormant and in the energy savings state.

In block 445, the coverage cell 106 receives the Handover (HO) Request messages (Msgs) and the eNB Configuration (Config) Update with the Deactivation Indication IE. In this manner, the coverage cell 106 can determine the capacity booster cell 105 is going to transition into an energy savings state and should not hand the UE's back to cell 105. In an exemplary embodiment, the coverage cell 106 determines (block 437) whether, for a selected UE (or multiple UEs), the capacity booster cell 105, which is currently in an energy saving state in this example, would have a better performing radio frequency interface (Uu) connection with the selected user equipment than the selected user equipment currently has with the coverage cell 106. For instance, in block 450, an eNB 107 may be configured with certain QCI/QoS parameters when a certain radio access bearer is set up to be used for a UE user application. The eNB receives, for instance, an S1: INITIAL CONTEXT SETUP REQUEST message or an S1: E-RAB SETUP REQUEST message containing a E-RAB Level QoS Parameters IE which contains a QCI IE indicating a GBR bearer (as defined in 3GPP TS 23.203 V0.1.1 (2005-10)). The following is from the 3GPP TS 36.413 tabular, section 9.2.1.15, E-RAB Level QoS Parameters (which also states "This IE defines the QoS to be applied to an E-RAB"):

| IE/Group Name | Presence | Range | IE type and reference | Semantics description |
|---|---|---|---|---|
| E-RAB Level QoS Parameters | | | | |
| >QCI | M | | INTEGER (0 ... 255) | QoS Class Identifier defined in TS 23.401 [11]. Coding specified in TS 23.203 [13]. |
| >Allocation and Retention Priority | M | | 9.2.1.60 | |
| >GBR QoS Information | O | | 9.2.1.18 | This IE applies to GBR bearers only and shall be ignored otherwise. |

This configuration may occur in block 450, and also in block 450, it is determined by the coverage cell 106 that a selected UE E-RAB is configured with a QCl/QoS (e.g., as required for the UE), which is not being efficiently met in terms of, e.g., individual UE PRB usage and/or UE battery power usage and which implies that the current radio frequency interface (e.g., Uu) connection (e.g., link 115-1 of FIG. 1) is not as good perhaps as a radio frequency interface (e.g., Uu) connection (e.g., link 115-2 of FIG. 1) would be if the UE is able to be handed into the capacity booster cell 105. Put differently, the quality of the radio frequency coverage for the selected user application may be improved by having the user equipment connect to the capacity booster cell 105 instead of remaining connected to the coverage cell. Thus, particular E-RAB configurations with particular QCI and QOS values (e.g., see section 9.2.1.15 of 3GPP TS 36.413) may result in a capacity booster cell not triggered to go dormant (see block 487, described below) or to be reactivated (see blocks 470/475) if a UE is within the coverage area of the capacity booster cell 105 and the capacity booster cell 105 is dormant, regardless of the average cell load (e.g., as determined using percent PRB usage) configured values for ES given with conventional systems.

As another example, in block 455, the eNB 107 detects that individual UE(s) meet certain criteria. Exemplary criteria are shown in block 460. An eNB 107 may determine any one or more of the following applies to a selected UE: 1) a UE has little power headroom; 2) an UL bit rate metric for a UE exceeds a threshold; 3) a UE requires high performance; 4) a UE MCS level meets certain criteria, and 5) a UE has significant battery usage. These are non-limiting and merely exemplary and other criteria may be used. Each of these implies that the current radio frequency interface (e.g., Uu) connection (e.g., link 115-1 of FIG. 1) is not nearly as good perhaps as a radio frequency interface (e.g., Uu) connection (e.g., link 115-2 of FIG. 1) would be if the UE is able to be handed into the capacity booster cell 105. If one or more of the criteria are not met (blocks 450 and 455=No), the coverage cell 106 proceeds to block 450. That is, connected UEs are continued to be serviced. If one or more of the criteria are met (one of blocks 450 or 455=Yes), the coverage cell 106 proceeds to block 465.

In block 465, it is determined if the UE(s) is in or moving into coverage area of the capacity booster cell 105. As stated above, there are a number of techniques useful to detect if a UE resides in the coverage area of a capacity booster cell 105: 1) internal mechanisms of the coverage eNB, e.g. TA/AOA mechanisms; 2) probing, where the coverage cell activates pico cell(s) for a brief time period to obtain UE measurements; 3) a pico cell is in a discontinuous carrier activation mode; 4) UE reports based, e.g., on satellite location systems; 5) Minimization of drive testing (MDT); 6) UE measurement reports of other cells on the same and/or different; 7) requests to a positioning server; and 8) combinations of the above. If location of UE(s) is not certain, the coverage cell 106 may send the X2:Cell Activation Request message (block 470) to multiple capacity booster cells, one of which the UE might be able to connect to as an original cell (per normal HO triggers). Alternately, the capacity booster cell(s) may be placed in a discontinuous transmission mode (e.g., discontinuous carrier activation mode) to enable UE positioning. Such a mode is described in U.S. Pat. Ser. No. 13/428,852, filed on Mar. 23, 2012, entitled "BASE STATION POWER SAVINGS AND CONTROL THEREOF", by inventors Michael Bach and Robert Nikides.

If the UE(s) is not in or moving into the coverage area of the capacity booster cell 105 (block 465=No), the coverage cell 106 proceeds to block 450. If the UE(s) is in or moving into the coverage area of the capacity booster cell 105 (block 465=Yes), the coverage cell 106 sends (block 470) a Cell Activation Request message (Msg) to the capacity booster cell 105. This message includes, e.g., an instruction for the capacity booster cell 105 to transition from the energy saving state to an active state (e.g., Tx and Rx fully on). In block 475, the coverage cell 106 also sends HO Request messages (msg(s)) with a "don't go dormant" IE for the selected (e.g., "high value") UE(s) (e.g., or to indicate the UE has a high value user application). Responsive to the Cell Activation Request message, in block 480, the capacity booster cell 105 transitions from the energy saving state to an active state (e.g., Tx and Rx fully on). Responsive to the HO Request messages with a "don't go dormant" IE for the selected (e.g., "high value") UE(s), the capacity booster cell 105 in block 480 remains in an active state at least until the high value UE(s) or UE user application(s) are no longer attached to the capacity booster cell 105. In an example, the requested application should result in a MME (mobility management entity) requesting the eNB to set up an E-RAB (associated with particular QCI/QOS values besides IP addresses, etc., for that type application's needs) to be used for that user application. If the user closes out the user application, the closure should result in the MME requesting the eNB to release the E-RAB for the user application. In block 485, the capacity booster cell 105 updates the O&M system 191 (e.g., the EMS 405) to indicate the booster cell is activated. Once the high value UE(s) are no longer attached to the capacity booster cell 105 or released the E-RAB(s) associated high value user application, the capacity booster cell 105 may return to block 415 and may return to the energy savings state.

Regarding the "don't go dormant" IE referred to in block 475 of FIG. 4, FIG. 5 is a table representing a number of IEs and includes a "Don't go Dormant" IE useful for an exemplary embodiment of the instant invention. The table (without the Don't go Dormant IE information) is shown in section 9.1.1.1 (HANDOVER REQUEST) of 3GPP TS 36.423 V11.0.0 (2012-03). The Don't go Dormant IE is a new IE instruction used to inform the capacity booster cell 105 the cell should not go dormant (e.g., into an energy saving state) while the corresponding UE is connected to the capacity booster cell 105. It is noted this instruction also means the cell receiving this UE and corresponding IE should not hand the UE back to the coverage cell 106 and go dormant due to low overall load. The Don't go Dormant IE would be described in this example in section 9.2.x.x (i.e., a future section) of TS 36.423. The sections listed in FIG. 5 are from TS 36.423, the presence of M indicates the IE/Group is mandatory, and O indicates the IE/Group is optional.

It is noted that the description above with respect to FIG. 4 indicates that the capacity booster cell 105 is in an energy saving state when block 475 is performed. However, that need not be the case. In other words, the capacity booster cell 105 may be in an active state and blocks 437, 450, 455, and 465 would still be performed by the coverage cell 106. In this example, block 470 would not be performed (i.e., because the capacity booster cell 105 is not in the energy saving state), but block 475 would be performed. This allows the coverage cell 106 to instruct an active capacity booster cell 105 to remain active for high value UE(s). In another example, the Cell Activation Request message in block 470 is modified and the HO Request message in block 475 may not include the Don't Go Dormant IE. For instance, in block 470, the coverage cell 106 sends an optional IE (called "Enable for UE" herein) added in the X2:Cell Activation Request Message in block 470 that indicates the receiving cell should be Activated (e.g., switch On) and remain activated for at least the length of the connection for the UE(s) which is (are) identified by the Enable for UE IE. FIG. 6 illustrates a table of possible elements in a Cell Activation Request message in accordance with an exemplary embodiment. This figure is a representation (without the Enable for UE) of section 9.1.2.20, CELL ACTIVATION REQUEST, of TS 36.423. This message is sent by an eNB to a peer eNB to request a previously switched-off cell/s to be re-activated. The direction is from eNB$_1$ (i.e., coverage cell 106) to eNB$_2$ (i.e., capacity booster cell 105). A new information element is Enable for UE, which is optional and is described in section 9.2.x.y (e.g., a to be added section), which is partially shown in FIG. 7. The Enable for UE IE requests that the receiving eNB activate the cell and provide service to the identified UE IDs, which are to be handed over to the receiving eNB. FIG. 7 illustrates two tables for an Enable for UE IE. The first (topmost) table describes elements of the IE, including eNB UE X2AP ID (e.g., each of which is a unique ID for a UE) and a second table describing a maxnoofUEs range. The maximum number of UEs (maxnoofUEs) is 256 in this example.

The eNB receiving the X2:Cell Activation Request Message with this new IE should remain activated for the given UE(s) regardless of configured switch off threshold(s) (e.g., esActivationOriginalCellLoadParameters, see below). The capacity booster eNB 108 may be expected to go dormant again if load is not above a switch-off threshold when the UE(s) disconnects and, e.g., after a suitable time duration and if no individual UE needs require continued activation of the capacity booster cell.

In another example, the capacity booster cell 105 can make a determination in block 487 as to whether individual UE(s)/user application(s) metrics meet certain criteria. As noted above, the capacity booster cell does not deactivate simply based on average PRB load thresholds as described above, but also based on individual UE criteria which are described herein that the coverage cell also uses, e.g., if the booster cell is already deactivated. The criteria may include the criteria described in relation to blocks 450, 455, and 460, along with other criteria described herein. In one example, block 487 performs an opposite operation as to what is in block 437: the eNB 108 determines the eNB 108 could support a better performance Uu connection as compared to a Uu connection with a coverage eNB 107. Responsive to a determination the individual UE(s)/application(s) meet the certain criteria, the booster cell in block 480 remains activated at least until high value UE(s)/user application(s) is/are no longer connected.

Regarding metrics in block 410 used to configure the capacity booster cell 105 or in block 435 to configure the coverage cell 106, an addition may be made to 3GPP TS 32.522 for the following exemplary additional original cell load threshold(s) based on individual UE PRB usage. One such attribute is esActivationOriginalCellUE-LoadParameters. This attribute indicates the traffic load threshold for a UE used by distributed ES algorithms to allow a cell to enter the energySaving state. A corresponding threshold is an integer between 0..100 (Percentage of UL PRB usage, see 3GPP TS 36.314). This attribute may also be based on a UE transmission cost metric. Duration time may also be added as well. For instance, time duration associated with load threshold for may be used as is currently specified along with overall load. See the following example paragraph definition from 3GPP TS 32.522 (part of table 5.5.1.1):

Checking for UE load above the esDeactivationCandidate-CellUELoadParameters may be triggered by a low value for the UE reported power headroom. The power headroom (PH), expressed in dB, is defined as the difference between the configured maximum UE output power (PCMAX), which is defined in section 6.2.5 in TS 36.101 and the estimated power for PUSCH transmission according to section 5.1.1.1 in 3GPP TS 36.213.

Determination of the UE transmission cost in a coverage cell 106 may be based on a UE metric composed of one or more of the following parameters: 1) Power Headroom (PH): low average value, 2) Spatial multiplexing: No, i.e. a single spatial layer 3) Bit rate: high average value, 4) MCS: low average value. Actual metrics may be implementation specific. These may be implemented, e.g., by blocks 460 and 455 of FIG. 4 above. Additional information regarding these parameters is provided below. The following information is from 3GPP TS 36.321 V10.5.0 (2012-03). In section 6.1.3.6 (Power Headroom MAC Control Element), it states the following:

"Power Headroom MAC control element is identified by a MAC PDU subheader with LCID as specified in table 6.2.1-2. It has a fixed size and consists of a single octet defined as follows (FIG. 6.1.3.6-1):

R: reserved bit, set to "0";

Power Headroom (PH): this field indicates the power headroom level. The length of the field is 6 bits. The reported

| | |
|---|---|
| esActivationOriginalCellLoadParameters | This attribute indicates the traffic load threshold and the time duration, which are used by distributed ES algorithms to allow a cell to enter the energySaving state. The time duration indicates how long the load needs to have been below the threshold. Threshold: Integer 0 . . . 100 (Percentage of PRB usage, see 3GPP TS 36.314 [13]) TimeDuration: Integer (in unit of seconds) |

These metrics may be used in block 455 or 487. Furthermore, an addition may be made to TS 32.522 to add an additional candidate cell load threshold based on individual UE PRB usage.

Another example is the attribute esDeactivationCandidate-CellUELoadParameters. This attribute indicates the traffic load threshold for a UE used by distributed ES algorithms to allow a cell to leave the energySaving state. The threshold is an Integer between 0..100 (Percentage of UL PRB usage, see 3GPP TS 36.314). This attribute may also be based on a bit rate metric.

If the coverage cell 106 detects (block 455 of FIG. 4) a UE has a high transmission cost, e.g. surpasses the esDeactivationCandidateCellUELoadParameters or transmission cost metric, and the UE could connect to a capacity booster cell 105 (with normal HO triggers when active), but the capacity booster cell 105 is in the dormant state, then the coverage cell 106 sends an X2:Cell Activation Request message to the dormant cell and includes a new IE indicating UE(s) that cell should service these UEs (as described above in reference to FIGS. 6 and 7) and remain in an active state while doing so.

UE location (as noted above) may be known via UE reports based on, e.g., satellite location systems which might be mapped to known dormant cell coverage, based on MDT reports, based on eNB based positioning methods e.g. based on TA and AOA (angle of arrival), or any other suitable technique. If location of UE(s) is not certain, the coverage cell 106 may send the X2:Cell Activation message to multiple capacity booster cells, one of which the UE might be able to connect to as an original cell (per normal HO triggers). Alternately, the capacity booster cell(s) may be placed in a discontinuous transmission mode to enable UE positioning.

PH and the corresponding power headroom levels are shown in Table 6.1.3.6-1 below (the corresponding measured values in dB can be found in subclause 9.1.8.4 of [9])."

The following table is table 6.1.3.6-1, Power Headroom levels for PHR (power headroom report), from 3GPP TS 36.321:

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| . . . | . . . |
| 60 | POWER_HEADROOM_60 |
| 61 | POWER_HEADROOM_61 |
| 62 | POWER_HEADROOM_62 |
| 63 | POWER_HEADROOM_63 |

The following information is from 3GPP TS 36.133 V10.5.0 (2011-12). In section 9.1.8.4, Report Mapping, it states the following: "The power headroom reporting range is from −23 . . . +40 dB. Table 9.1.8.4-1 defines the report mapping." Table 9.1.8.4-1, Power headroom report mapping, is shown below:

| Reported value | Measured quantity value (dB) |
|---|---|
| POWER_HEADROOM_0 | $-23 \leq PH < -22$ |
| POWER_HEADROOM_1 | $-22 \leq PH < -21$ |

-continued

| Reported value | Measured quantity value (dB) |
| --- | --- |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

So low reported values of power headroom indicate the UE is transmitting at its maximum power. Thus, certain thresholds for average UE reported Power Headroom level for a time duration may result in a capacity booster cell 105 triggered not to go dormant (see, e.g., blocks 455/460/465/470/475, 487, and 480) or to be reactivated if a particular UE is within the coverage area of the capacity booster cell 105, regardless of the current cell load (e.g., as determined using percent PRB usage) configured values for ES. This may be combined with an average UE bit rate usage.

High bit rate user applications may be indicated via the Bit Rate IE present in bearer setup messages received by the eNB via the S1-AP interface as given in 3GPP TS 36.413 V10.4.0 (2011-12) per the following sections. In section 9.2.1.18, GBR QoS Information, the following is stated: "This IE indicates the maximum and guaranteed bit rates of a GBR bearer for downlink and uplink." The following table is also from section 9.2.1.18.

| IE/Group Name | Presence | Range | IE type and reference | Semantics description |
| --- | --- | --- | --- | --- |
| E-RAB Maximum Bit Rate Downlink | M | | Bit Rate 9.2.1.19 | Desc.: This IE indicates the maximum downlink E-RAB Bit Rate as specified in TS 23.401 [11] for this bearer. |
| E-RAB Maximum Bit Rate Uplink | M | | Bit Rate 9.2.1.19 | Desc.: This IE indicates the maximum uplink E-RAB Bit Rate as specified in TS 23.401 [11] for this bearer. |
| E-RAB Guaranteed Bit Rate Downlink | M | | Bit Rate 9.2.1.19 | Desc.: This IE indicates the downlink guaranteed E-RAB Bit Rate as specified in TS 23.401 [11] (provided that there is data to deliver) for this bearer. |
| E-RAB Guaranteed Bit Rate Uplink | M | | Bit Rate 9.2.1.19 | Desc.: This IE indicates the uplink guaranteed E-RAB Bit Rate as specified in TS 23.401 [11] (provided that there is data to deliver) for this bearer |

In section 9.2.1.19, Bit Rate, it states the following: "This IE indicates the number of bits delivered by E-UTRAN in UL or to E-UTRAN in DL within a period of time, divided by the duration of the period. It is used, for example, to indicate the maximum or guaranteed bit rate for a GBR bearer, or an aggregated maximum bit rate." The following table is from section 9.2.1.19.

| IE/Group Name | Presence | Range | IE type and reference | Semantics description |
| --- | --- | --- | --- | --- |
| Bit Rate | | | INTEGER (0 ... 10,000,000,000) | The unit is: bit/s |

MCS indices are defined in 3GPP TS 36.213 V10.4.0 (2011-12), tables 7.1.7.1-1 and 8.6.1-1, and determine UE throughput based on the modulation order and redundancy to be used with the transmission. Low MCS values indicate the transmission requires lower modulation orders and more redundancy which is associated with higher propagation losses over the wireless link 115-1.

The techniques of activating a dormant cell to handle a UE requiring high Uu perf may also be triggered (e.g., block 450 in FIG. 4) by the coverage eNB 107 receiving particular QCI value(s) in the S1AP bearer setup procedures (see TS 36.413) for a UE, e.g., QCI values for user applications requiring high bandwidth, low latency such as real time gaming (QCI=3) and/or live streaming video (QCI=2). This may be combined with large values for GBR QoS information, in particular for the IE supplied in the bearer setups that indicates the uplink guaranteed E-RAB Bit Rate as specified in 3GPP TS 23.401. FIG. 8 is a table of E-RAB Level QoS Parameters from section 9.2.1.15 of 3GPP TS 36.413 V10.4.0 (2011-12).

Alternately or in addition, a new QCI value or new 36.413 S1AP IE associated with E-RAB setups can be defined to indicate to an eNB that the UE should be connected over the Uu interface with a high performance link in order to minimize UE battery consumption. The new indication to the dormant cell to support a specified UE regardless of overall cell load may as an addition or alternative include a new IE in HANDOVER REQUEST message. The capacity booster cell 105 may also make corresponding checks as described herein for the coverage cell before going dormant. The EMS 405 may configure, e.g., via an attribute, whether the techniques described herein are to be used by an eNB or not. Thus, certain average UE channel quality indication (CQI) indices thresholds for a time duration may result in a capacity booster cell not triggered to go dormant or to be reactivated if a UE is within its coverage area regardless of the average cell load (e.g., as determined using percent PRB usage) configured values for ES given per conventional systems. This may be combined with an average UE bit rate usage. CQI is reported by UE. CQI is similar to MCS and used to generate the MCS used. CQI is given as a table of 16 values. See 3GPP TS 36.213 Section 7.2.3, table 7.2.3-1.

Values of QOS, MCS and bit rate are per downlink and uplink. Spatial multiplexing is also possible in the uplink as well as the downlink. While uplink may be more critical, at least with respect to UE battery life, the capacity booster cell may be triggered not to go dormant or reactivated based on either or both of UE UL and DL threshold values. These parameter trigger values/thresholds are likely different for the booster cell than for the coverage cell. For instance, a capacity booster cell may not go dormant if a UE has one or more of significant tx power headroom indicated by UE reports of high PH values (i.e., UE transmitting at low power), high rank (multiple spatial layers possible), high MCS, and/or high reported channel quality index (CQI). Meanwhile, a coverage cell seeks to reactivate a booster cell for a UE that is connected to the coverage cell which e.g. experiences low power headroom (i.e., transmitting at high power), low rank (one layer, no spatial multiplexing), low MCS values, and/or low reported channel quality index (CQI). The values used for these by the capacity booster cell may be configured.

As yet another set of examples, if a UE has a high degree of spatial multiplexing available, i.e., the ability to send data on separate antenna paths via different layers as indicated by its average Rank Indicator (RI) for MIMO for a time duration, this may result in the capacity booster cell triggered not to go dormant (e.g., or not triggered to go dormant) or to be reactivated if the UE is within its coverage area regardless of the average cell load (e.g., as determined by percent PRB usage) configured values for ES. The UE reports its recommended RI to eNB. Therefore, certain thresholds for a certain average UE RI values for a time duration may result in a capacity booster cell triggered not to go dormant (e.g., or not triggered to go dormant) or to be reactivated if a UE is within the coverage area of the capacity booster cell 105, possibly combined with the coverage cell having knowledge that a activated capacity booster cell typically supports multiple spatial layers, regardless of the average cell load configured values for ES. This may be combined with an average UE bit rate usage.

Figure 9:
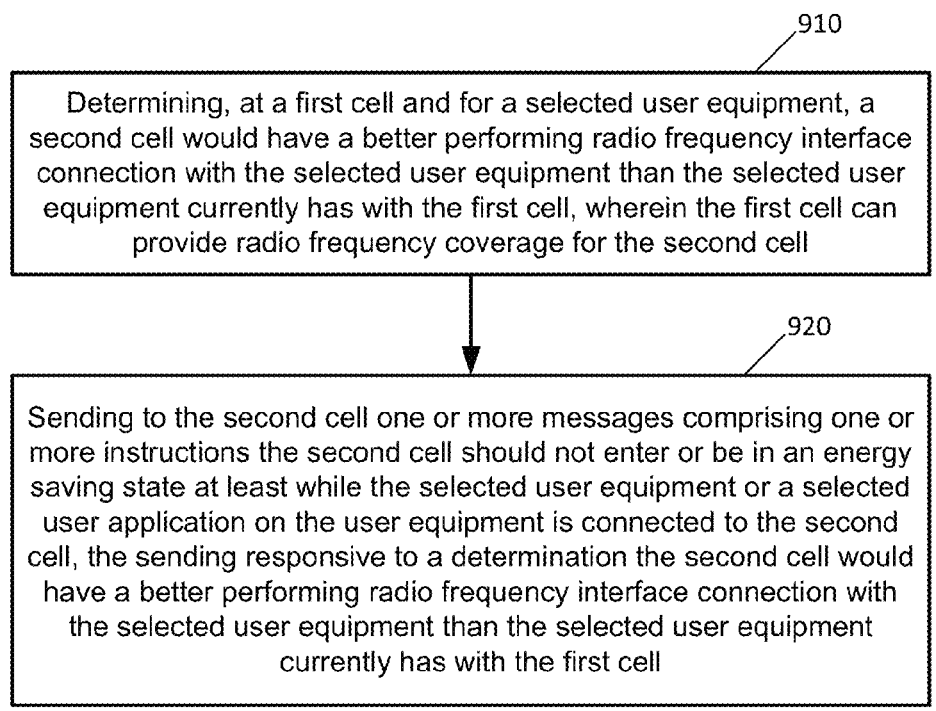
FIGS. 9 and 10 are each logic flow diagrams illustrating the operation of a method, and a result of execution of computer program instructions embodied on a computer readable memory, in accordance with the exemplary embodiments of this invention.

FIG. 9 is a logic flow diagram illustrating the operation of a method, and a result of execution of computer program instructions embodied on a computer readable memory, in accordance with the exemplary embodiments of this invention. The operations performed in these blocks are performed, e.g., by a base station such as the eNB 107 that forms a coverage cell 106. In block 910, the base station determines, at a first cell and for a selected user equipment, a second cell would have a better performing radio frequency interface connection with the selected user equipment than the selected user equipment currently has with the first cell. The first cell can provide radio frequency coverage for the second cell That is, technically, the UE need not be connected to second cell, as the first cell can provide radio frequency coverage for the UE over the coverage area of the second cell. That is, when the second cell is in an energy saving state, the first cell will provide (assuming the first cell is also not in the energy saving state) radio frequency coverage for the second cell. If the second cell is in an active state, the first cell can provide radio frequency coverage for the second cell, but for individual UEs may or may not provide the coverage (e.g., UEs that quickly move through the coverage area of the second cell may not be handed over from the first cell to the second cell). In block 920, the base station sends to the second cell one or more messages comprising one or more instructions the second cell should not enter or be in an energy saving state at least while the selected user equipment or a selected user application on the user equipment is connected to the second cell. The sending is responsive to a determination the second cell would have a better performing radio frequency interface connection with the selected user equipment than the selected user equipment currently has with the first cell.

Figure 10:
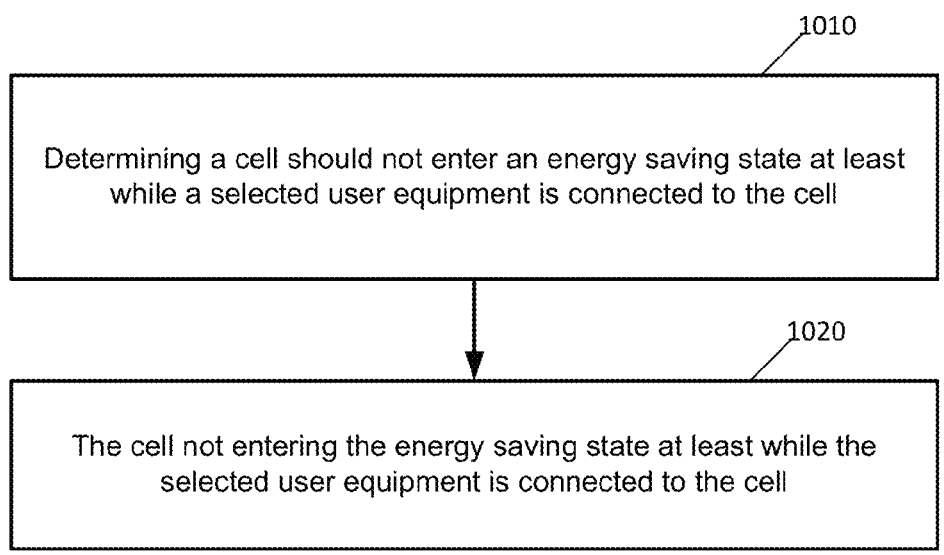
Figure 11:
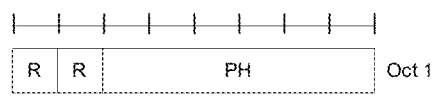
FIG. 11 is a Power Headroom MAC control element from FIG. 6.1.2.6-1 of 3GPP TS 36.321 V10.5.0 (2012-03).

FIG. 10 is a logic flow diagram illustrating the operation of a method, and a result of execution of computer program instructions embodied on a computer readable memory, in accordance with the exemplary embodiments of this invention. The operations performed in these blocks are performed, e.g., by a base station such as eNB 108 that forms a capacity booster cell 105. In block 1010, the base station determines a cell should not enter an energy saving state at least while a selected user equipment is connected to the cell. In block 1020, the base station causes the cell to not enter the energy saving state at least while the selected user equipment is connected to the cell.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium (e.g., memory 125, 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   detecting, at a first cell, that a selected user equipment requires high performance or has significant battery usage;
   determining, at said first cell and for said selected user equipment, that a second cell would have a better performing radio frequency interface connection with the selected user equipment than the selected user equipment has with the first cell, wherein the first cell can provide radio frequency coverage for the second cell;
   determining the selected user equipment is in or is expected to enter a coverage area of the second cell and determining the selected user equipment or quality of the radio frequency coverage for the selected user application meets one or more criteria, including determining one or more particular radio access bearer configurations are associated with the selected user application, wherein the one or more radio access bearer configurations have one or more particular values of one or both of quality of service class identifiers or quality of service, and based on the determination of the one or more particular radio access bearer configurations;
   responsive to a determination the selected user equipment or the quality of the radio frequency coverage for the selected user application meet one or more criteria, determining the second cell would have the better performing radio frequency interface connection with the selected user equipment than the selected user equipment has with the first cell; and
   sending to the second cell one or more instructions that the second cell should not enter or be in an energy saving state at least while the selected user equipment or a selected user application on the selected user equipment is connected to the second cell, the sending being responsive to the determination that the second cell would have a better performing radio frequency interface connection with the selected user equipment than the selected user equipment has with the first cell.

2. The method of claim 1, wherein the one or more instructions comprise a handover request message comprising the instruction the second cell should not enter an energy saving state at least while the selected user equipment is connected to the second cell.

3. The method of claim 1, wherein the second cell is in an energy saving state when the determining is performed and wherein the one or more instructions further comprises an instruction for the second cell to activate itself.

4. The method of claim 1, wherein the selected user application on the selected user equipment is connected to the second cell at least while a radio access bearer for the user application is active and not released.

5. The method of claim 1, wherein determining the selected user equipment or quality of the radio frequency coverage for the selected user application meets one or more criteria further comprises one of:
   determining a certain threshold is met for an average power headroom level, reported by the selected user equipment, for a time duration;
   determining an average rank indicator for multiple-input, multiple output for a time duration for the selected user equipment meets a certain threshold; and
   determining channel quality indication indices for the selected user equipment for a time duration meets a certain threshold.

6. A method comprising:
   receiving one or more instructions from a first cell, said first cell having detected that a selected user equipment requires high performance or has significant battery usage, that a second cell should not enter or be in an energy saving state at least while said selected user equipment or a selected user application on the selected user equipment is connected to the second cell, in response to a determination that the selected user equipment is in or is expected to enter a coverage area of the second call and that the second cell would have a better performing radio frequency interface connection with the selected user equipment than the selected user equipment has with the first cell;
   determining that the selected user equipment or quality of radio frequency coverage for a selected user application on the selected user equipment meets one or more criteria, including determining one or more particular radio access bearer configurations are associated with the selected user application, wherein the one or more radio access bearer configurations have one or more particular values of one or both of quality of service class identifiers or quality of service; and
   responsive to the determination the selected user equipment or the quality of the radio frequency the cell should not enter an energy saving state at least while the selected user equipment or the selected user application is connected to the cell, controlling the second cell such that the second cell does not enter the energy saving state at least while the selected user equipment or the selected user application is connected to the second cell.

7. The method of claim 6, wherein the one or more instructions comprise a handover request message comprising an instruction the second cell should not enter an energy saving state at least while the selected user equipment is connected to the second cell.

8. The method of claim 6, wherein the second cell is in an energy saving state when receiving at least one of the one or more instructions, wherein the one or more instructions further comprise an instruction for the second cell to activate itself, and wherein the second cell, responsive to the instruction for the second cell to activate itself, transitions from the energy saving state to an active state.

9. The method of claim 6, wherein determining the selected user equipment or quality of the radio frequency coverage for the selected user application meets one or more criteria further comprises one of:
   determining a certain threshold is met for an average power headroom level, reported by the selected user equipment, for a time duration;
   determining an average rank indicator for multiple-input, multiple output for a time duration for the selected user equipment meets a certain threshold;
   determining modulation and coding scheme indices for the selected user equipment for a time duration meets a certain threshold;
   determining channel quality indication indices for the selected user equipment for a time duration meets a certain threshold; and
   determining whether one or more of quality of service, modulation and coding scheme indices, or bit rate values meet certain criteria.

10. An apparatus comprising:
    one or more processors; and
    one or more memories including computer program code, the one or more memories and the computer program code configured, with the one or more processors, to cause the apparatus to perform the following:
    detecting, at a first cell, that a selected user equipment requires high performance or has significant battery usage;
    determining, at said first cell and for said selected user equipment, that a second cell would have a better performing radio frequency interface connection with the selected user equipment than the selected user equipment has with the first cell, wherein the first cell can provide radio frequency coverage for the second cell;
    determining the selected user equipment is in or is expected to enter a coverage area of the second cell and determining the selected user equipment or quality of the radio frequency coverage for the selected user application meets one or more criteria, including determining one or more particular radio access bearer configurations are associated with the selected user application, wherein the one or more radio access bearer configurations have one or more particular values of one or both of quality of service class identifiers or quality of service, and based on the determination of the one or more particular radio access bearer configurations;
    responsive to a determination the selected user equipment or the quality of the radio frequency coverage for the selected user application meet one or more criteria, determining the second cell would have the better performing radio frequency interface connection with the selected user equipment than the selected user equipment has with the first cell; and
    sending to the second cell one or more instructions that the second cell should not enter or be in an energy saving state at least while the selected user equipment or a selected user application on the selected user equipment is connected to the second cell, the sending being responsive to the determination that the second cell would have a better performing radio frequency interface connection with the selected user equipment than the selected user equipment has with the first cell.

11. The apparatus of claim 10, wherein a cell activation request message or a handover request message comprises the instruction that the second cell should not enter the energy saving state while the selected user equipment or the selected user application is connected to the second cell.

12. An enhanced NodeB comprising the apparatus of claim 10.

13. An apparatus comprising:
one or more processors; and
one or more memories including computer program code, the one or more memories and the computer program code configured, with the one or more processors, to cause the apparatus to perform the following:
receiving one or more instructions from a first cell, said first cell having detected that a selected user equipment requires high performance or has significant battery usage, that a second cell should not enter or be in an energy saving state at least while said selected user equipment or a selected user application on the selected user equipment is connected to the second cell, in response to a determination that the selected user equipment is in or is expected to enter a coverage area of the second call and that the second cell would have a better performing radio frequency interface connection with the selected user equipment than the selected user equipment has with the first cell;
determining the selected user equipment or quality of radio frequency coverage for a selected user application on the selected user equipment meets one or more criteria, including determining one or more particular radio access bearer configurations are associated with the selected user application, wherein the one or more radio access bearer configurations have one or more particular values of one or both of quality of service class identifiers or quality of service; and
responsive to the determination the selected user equipment or the quality of the radio frequency the cell should not enter an energy saving state at least while the selected user equipment or the selected user application is connected to the cell, controlling the second cell such that the second cell does not enter the energy saving state at least while the selected user equipment or the selected user application is connected to the second cell.

14. An enhanced NodeB comprising the apparatus of claim 13.

* * * * *